US010549426B2

(12) United States Patent
Moriniere et al.

(10) Patent No.: US 10,549,426 B2
(45) Date of Patent: Feb. 4, 2020

(54) METHOD FOR ESTIMATING MOVEMENT OF A POLY-ARTICULATED MASS OBJECT

(71) Applicants: MOVEA, Grenoble (FR); COMMISSARIAT A L'ENERGIE ATOMIQUE ET AUX ENERGIES ALTERNATIVES, Paris (FR)

(72) Inventors: Boris Moriniere, Grenoble (FR); Claude Andriot, Paris (FR)

(73) Assignees: Commissariat A L'Energie Atomique et aux Energies Alternatives, Paris (FR); MOVEA, Grenoble (FR)

( * ) Notice: Subject to any disclaimer, the term of this patent is extended or adjusted under 35 U.S.C. 154(b) by 691 days.

(21) Appl. No.: 14/758,920

(22) PCT Filed: Dec. 10, 2013

(86) PCT No.: PCT/EP2013/076004
§ 371 (c)(1),
(2) Date: Jul. 1, 2015

(87) PCT Pub. No.: WO2014/106564
PCT Pub. Date: Jul. 10, 2014

(65) Prior Publication Data
US 2015/0336273 A1 Nov. 26, 2015

(30) Foreign Application Priority Data
Jan. 2, 2013 (FR) ...................... 13 50012

(51) Int. Cl.
*B25J 9/16* (2006.01)
(52) U.S. Cl.
CPC .................. *B25J 9/1694* (2013.01)

(58) Field of Classification Search
None
See application file for complete search history.

(56) References Cited

U.S. PATENT DOCUMENTS 8,165,844 B2* 4/2012 Luinge .................. G06F 3/011
382/107
2008/0285805 A1* 11/2008 Luinge .................. A61B 5/1114
382/107

(Continued)

FOREIGN PATENT DOCUMENTS

WO 2010007160 A1 1/2010

OTHER PUBLICATIONS

International Search Report and Written Opinion from PCT/EP2013/076004, dated Feb. 6, 2014.

(Continued)

*Primary Examiner* — Ali Naraghi
(74) *Attorney, Agent, or Firm* — BakerHostetler

(57) ABSTRACT

Movement of a poly-articulated object, having a plurality of segments linked by at least one articulation, is estimated. Inertial measurements are obtained from capture modules that are fixed relative to respective segments, each module having an accelerometer and a gyrometer, with the measurements being expressed in a measurement reference frame that is fixed relative to the respective segment. The measurements are used to determine at least one stress vector external to the object so as to control a physical model of this object representing the object. Kinematic quantities associated with the segments of the object are then estimated using fundamental dynamics principles using the computed stress vector(s).

19 Claims, 4 Drawing Sheets

(56) References Cited

U.S. PATENT DOCUMENTS

2011/0173831 A1* 7/2011 Caritu ..................... B25J 5/00
                                                   33/700
2011/0208473 A1* 8/2011 Bassompiere ......... G01C 17/38
                                                  702/141
2011/0264400 A1* 10/2011 Youssef ............... G01C 21/165
                                                  702/141

OTHER PUBLICATIONS

Bender et al. "Interactive Simulation of Rigid Body Dynamics in Computer Graphics" Eurographics 2012, Star—State of the Art Report, 2012, 20 Pages.

* cited by examiner

METHOD FOR ESTIMATING MOVEMENT OF A POLY-ARTICULATED MASS OBJECT

FIELD OF THE INVENTION

Embodiments of the invention relate to a method for estimating movement of a poly-articulated mass object and are applicable to capturing the movement of a poly-articulated object using inertial sensors arranged on the object.

BACKGROUND OF THE INVENTION

A number of existing techniques can be used to capture the movement of a poly-articulated object. The systems implementing these techniques can be classified into two categories.

The first category combines the systems that use at least one sensor and have recourse to an external device that serves as an absolute reference. By way of illustration, the external device can include one or more cameras situated at known positions. In another example, this external device can include one or more emitters of ultrasound, electromagnetic or other type of energy, said emitters being positioned at known positions in the environment.

The second category combines the systems consisting exclusively of sensors that do not have recourse to an external device serving as an absolute reference. Advantageously, the systems belonging to the second category benefit from an unlimited space of use because the poly-articulated object is not constrained to remain within the operational space of external devices used as absolute reference, this operational space corresponding, for example, to the field of view of a camera or to the range of an emitter. However, the systems of this category exhibit a phenomenon of estimation drift because they are deprived of any reference relative to the environment. In other words, the error in the estimations of the positions relative to the environment of the elements that make up the poly-articulated object is not bounded in time. The elements that make up the poly-articulated object are called segments.

Some systems belonging to the second category, that is to say comprising only sensors that do not have recourse to an external device serving as absolute reference, use inertial/magnetic sensors such as, for example, gyrometers, accelerometers or magnetometers. These sensors can be implemented by using the technology of micro-electromechanical systems (MEMS). This makes it possible to obtain compact and lightweight sensors. Thus, it is possible to instrument the poly-articulated object with this type of sensor without hampering its movement. Since the MEMS sensors are low energy consumers, they are often embedded onboard small independent and energy-autonomous modules which transmit their information to a central unit via a wireless link. Moreover, the MEMS sensors are particularly inexpensive.

Hereinafter in the description, the word "accelerometer" denotes a sensor capable of measuring the vector sum of its proper acceleration and of gravity. The word "gyrometer" denotes a sensor capable of measuring the rotational speed vector relative to an immobile reference frame. The word "magnetometer" denotes a sensor capable of measuring the Earth's magnetic field vector. The measurements are expressed in the reference frame of the sensor.

Estimating the translational position of a free mobile object in space via measurements from MEMS inertial/magnetic sensors is a problem that is difficult to resolve. The only information that emerges from the translation is the measurement from the accelerometer. To obtain a translational position, it is possible to integrate proper acceleration twice as a function of time. Since an accelerometer measures both the proper acceleration of the object to which it is attached but also the acceleration linked to the ambient gravitational field, it is necessary to extract gravity from the accelerometer measurement before performing the double time integration. The capacity to cancel the effects of gravity depends on the capacity of the system to finely estimate its orientation, and to do so for all the dynamics of the movement.

Even a very small error of a milli-radian (mrad) in the estimation of the orientation induces an error of 0.01 m/s$^2$ on the extracted proper acceleration. If this error is not corrected, it is translated, after the double integration, into an error of 4.5 meters at the end of thirty seconds. The orientation estimation errors of the devices are generally significantly greater than a milli-radian, all the more so as the efficiency of the methods is very generally dependent on the dynamics of the movement captured. Thus, if this estimation drift is not reduced, an accurate estimation of the translation of a free mobile object is impossible.

A movement estimation system that makes it possible to reduce this drift is described in U.S. Pat. No. 8,165,844. The proposed solution relies on a device made up of a set of capture modules arranged on segments of the poly-articulated object. Each module is equipped with inertial/magnetic sensors (accelerometer, gyrometer and possibly magnetometer). The device further comprises a merging circuit that makes it possible to estimate the position and the orientation of the segments. The merging is based on the inertial/magnetic measurements originating from the capture modules. The measurements can be collected by wire or wirelessly.

The method making it possible to reduce the drift on the estimation of the position comprises an estimation phase and a correction phase.

The estimation phase comprises two steps. In a first step, kinematic quantities are estimated for each capture module from the measurements that they supply. The expression "kinematic quantities" denotes the position, the speed and the acceleration of a rigid body. These quantities are expressed relative to the capture module and not relative to the segment to which the sensor is attached. In a second step, the kinematic quantities of the segments are estimated based on the knowledge of the positioning of the sensors on the segments and the morphology of the poly-articulated object by using, for example, the length of the segments. The output from the estimation phase is an estimation of the kinematic quantities of the segments.

The correction phase improves this first estimation. It can contain up to three steps. In a first step, the limitations linked to the articulations are used to correct the estimation of the kinematic quantities of the segments. By way of example, an information item indicating a prohibited rotation about a particular axis can be used. In a second step, the detection of external contacts is used to correct the estimation of the kinematic quantities of the segments. This detection is made by using an external sensor or a heuristic based on the kinematic quantities of the segments expressed at particular points. In a third step, the measurements of external sensors are used in order to correct the estimation of the kinematic quantities of the segments. The external sensors are, for example, of GPS (global positioning system) or RFID (radio frequency identification) type. The data presented as output from the three steps of the correction phase are identical. They are an estimation of the kinematic quantities of the segments. The correction phase of this method therefore corresponds to a series of successive individual corrections.

A translational drift inherent in this method is the consequence of the use of a double time integration of the estimates of the proper acceleration for each sensor. If these estimates are very slightly incorrect, the estimates of the translational positions of the sensors are very different from their real values. The correction phase is implemented to correct these errors.

The various embodiments of the invention described hereinbelow offer an alternative to this method that makes it possible to reduce the drift on the estimation of the translational position by avoiding having recourse to a double time integration of the estimate of the proper acceleration at the level of each sensor.

SUMMARY OF THE INVENTION

One of the aims of various embodiments of the invention is to remedy drawbacks of the prior art and provide improvements thereto.

To this end, a subject of a preferred embodiment of the invention is a method for estimating movement of a poly-articulated mass object, comprising a plurality of segments linked by at least one articulation. The method comprises the following steps: acquisition of inertial measurements obtained from at least one capture module that is fixed relative to a segment, said module including an accelerometer and a gyrometer, said measurements being expressed in a measurement reference frame that is fixed relative to said segment; determination from said measurements of at least one stress vector external to the mass object so as to control a physical model of this object, said model representing the mass object; estimation of the kinematic quantities associated with the segments of the object by applying the fundamental principle of dynamics with the at least one stress vector determined in the preceding step.

The steps of the method are, for example, applied periodically with a predefined time step.

A step is, for example, applied for at least one articulation of the object so as to determine a stress and/or a strain associated with said articulation from the parameters representative of the links implemented by this articulation, this stress and/or this strain being used in the application of the fundamental principle of dynamics.

Measurements of the Earth's magnetic field can be acquired from the capture module, said module comprising, for this, a third sensor being a magnetometer.

A step of estimation of the orientation $R_{sensor}$ of the capture modules relative to a reference of the environment is for example applied for the at least one capture module by using the measurements acquired.

A step of determination of a moment $\overrightarrow{M_{position}}$ is for example applied by using the positioning $R_{sensor}^{sgmt}$ of the at least one capture module on its segment, the orientation $R_{sensor}$ of the capture module and the orientation $R_{sgmt}$ of the segment to which it is attached estimated in the preceding time step.

The moment $\overrightarrow{M_{position}}$ can be determined by using the following expression:

$$\overrightarrow{M_{position}} = K_r[(R_{sensor}^{sgmt} R_{sgmt} - R_{sensor}) - (R_{sensor}^{sgmt} R_{sgmt} - R_{sensor})^T]$$

in which:
$K_r$ is a diagonal matrix of size 3×3 corresponding to stiffness coefficients;
$X^T$ represents the transpose of a matrix X; and $\hat{}$ represents the cap operator such that:

$$\text{for any } v = \begin{bmatrix} v_x \\ v_y \\ v_z \end{bmatrix}, \hat{v} = \begin{bmatrix} 0 & -v_z & v_y \\ v_z & 0 & -v_x \\ -v_y & v_x & 0 \end{bmatrix}.$$

A step of determination of a moment $\overrightarrow{M_{speed}}$ representative of a speed control on a segment is for example applied after the acquisition of the measurements, said moment being determined from the positioning $R_{sensor}^{sgmt}$, from the speed of rotation of the capture module $\overrightarrow{\omega_{sensor}}$ and from the speed of rotation of the segment to which it is attached $\overrightarrow{\omega_{sgmt}}$ estimated in the preceding time step.

The moment $\overrightarrow{M_{speed}}$ is for example determined by using the following expression:

$$\overrightarrow{M_{position}} = B_r(\overrightarrow{\omega_{sgmt}} - R_{sensor}^{sgmt}\overrightarrow{\omega_{sensor}})$$

in which:
$B_r$ is a diagonal matrix of size 3×3 corresponding to damping coefficients.

A step determines, for example, a force $\overrightarrow{F_{acc}}$ representative of an acceleration control including gravity on the segment by using the masses m of the segments to which the capture modules are attached, measurements produced by the accelerometer and the estimation of the orientation $R_{sensor}$ of said module.

The force $\overrightarrow{F_{acc}}$ is for example determined for each segment by using the following expression:

$$\overrightarrow{F_{acc}} = mR_{sensor}R_{sensor}^T(\overrightarrow{g} + \overrightarrow{a_{sensor}})$$

in which:
$\overrightarrow{g}$ represents the gravity vector;
$\overrightarrow{a_{sensor}}$ represents the proper acceleration of the capture module.

A step determines, for example, a force $\overrightarrow{F_{sim}}$ simulating the effect of gravity on the segment by using the masses m of the segments and the position of the segments $p_{sgmt}$, $R_{sgmt}$ estimated in the preceding time step.

The aim of a step is, for example, to determine collision forces $\overrightarrow{F_{collision}}$, said forces being determined from contact information obtained from a detection of collision between the geometries of the segments and the geometry of the environment and from the modeling of the friction between the poly-articulated object and the environment.

Also a subject of an embodiment of the invention is a system for estimating movement of a poly-articulated mass object, comprising a plurality of segments linked by at least one articulation, the system comprising:
a set of at least one capture module positioned on at least one segment of the poly-articulated object, said module being fixed relative to a segment and including at least one accelerometer and one gyrometer;
a processing unit configured to acquire inertial measurements obtained from the at least one capture module, said measurements being expressed in a measurement reference frame that is fixed relative to said segment, and to determine, from said measurements, at least one stress vector external to the mass object so as to control a physical model of this object, said model representing the mass object, and estimate kinematic quantities associated with the segments of the object by applying the fundamental principle of dynamics with the at least one stress vector.

Also a subject of an embodiment of the invention is a computer program comprising instructions for the execution of the method described previously, when the program is executed by a processor.

BRIEF DESCRIPTION OF THE DRAWINGS

Other features and advantages of the invention will become apparent from the following description given by way of illustration and in a nonlimiting manner, in light of the attached drawings in which.

DETAILED DESCRIPTION OF THE PREFERRED EMBODIMENTS

Figure 1:
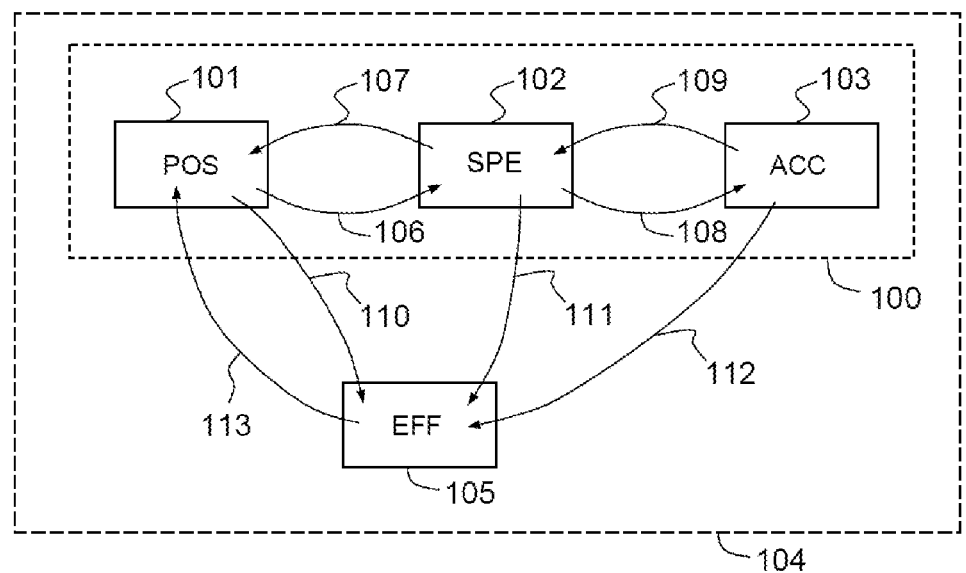
FIG. 1 illustrates the relationships which exist between the different dynamic quantities.

FIG. 1 illustrates relationships that exist between different dynamic quantities.

Kinematic quantities 100 combine the position 101, the speed 102 and the acceleration 103 of a rigid body. These quantities can refer equally to translation and to rotation.

Thus, the kinematic quantities combine:
the translational position;
the rotational position, also called orientation or angular position;
the speed of translation, also called linear speed;
the speed of rotation, also called rate of rotation or angular speed;
the translational acceleration, also called linear acceleration or proper acceleration; and
the rotational acceleration, also called angular acceleration.

The dynamic quantities 104 correspond to a set including the kinematic quantities 100 and of stresses 105. The stresses can refer equally to translation and to rotation. The term "stress" combines:
the forces, also referred to by the expression "translation stresses"; and
the moments, also referred to by the expression "rotation stresses".

Speed is the temporal derivative 106 of position. If an estimate of speed is available, it is possible to estimate position by proceeding with a time integration 107 of the speed.

Acceleration is the temporal derivative 108 of speed. If an estimate of acceleration is available, it is possible to estimate speed by proceeding with a time integration 109 of the acceleration.

A position difference can be converted into stress by the introduction of stiffness 110.

A speed difference can be converted into stress by the introduction of damping 111.

The sum of the stresses and of the acceleration are linked by Newton's second law 112, via the introduction of the mass and of the inertia matrix.

Finally, it is possible to obtain the position from the sum of the stresses by incorporating the equation of the fundamental principle of dynamics 113.

Figure 2:
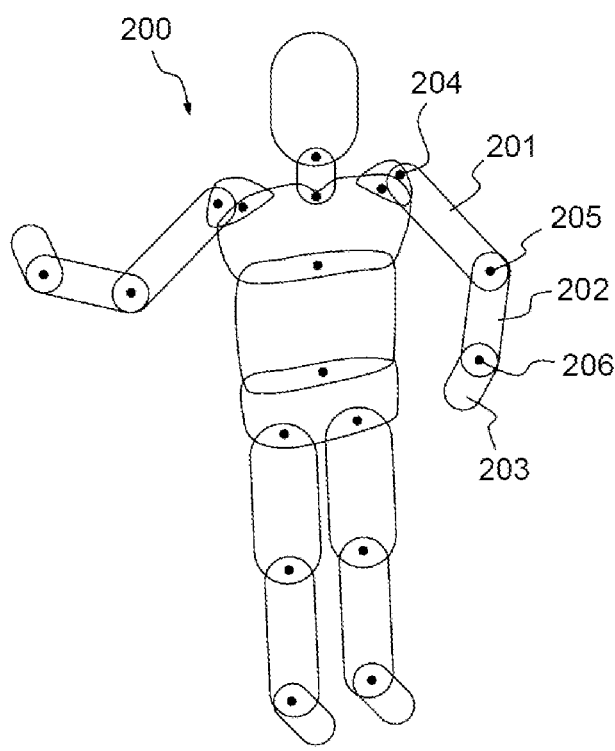
FIG. 2 provides an example of poly-articulated object used as physical model of the human body.

FIG. 2 provides an example of a poly-articulated object used as a physical model of the human body.

The object of interest is a poly-articulated object including segments linked by articulations. Hereinafter in the description, a segment denotes an object that is rigid or assumed to be rigid, defined by:
a geometry, that is to say a well defined volumetric shape; and
a mass and an inertia, an inertia matrix being defined in a reference frame specific to the segment.

Moreover, an articulation denotes a link between two segments. This link defines the relative configuration that a remote segment can have relative to a segment to which it is linked. An articulation is defined by:
one or more degrees of freedom representative notably of the characteristics of centers, of axes or of stops; and
one or more strains inducing absences of a degree of freedom representative notably of the characteristics of centers or of axes.

In the example of FIG. 2, a poly-articulated object 200 corresponding to a simple modeling of the human body is presented. This poly-articulated object includes nineteen segments linked by eighteen articulations. Thus, the hand is modeled by a first segment 203 linked by an articulation 206 to a second segment 202 corresponding to the forearm. The articulation 206 has, for example, two degrees of freedom. The segment 202 corresponding to the forearm is linked by an articulation 205 with two degrees of freedom to the segment 201 corresponding to the arm. For its part, the segment 201 is linked to the collar bone by an articulation 204 with three degrees of freedom.

Figure 3:
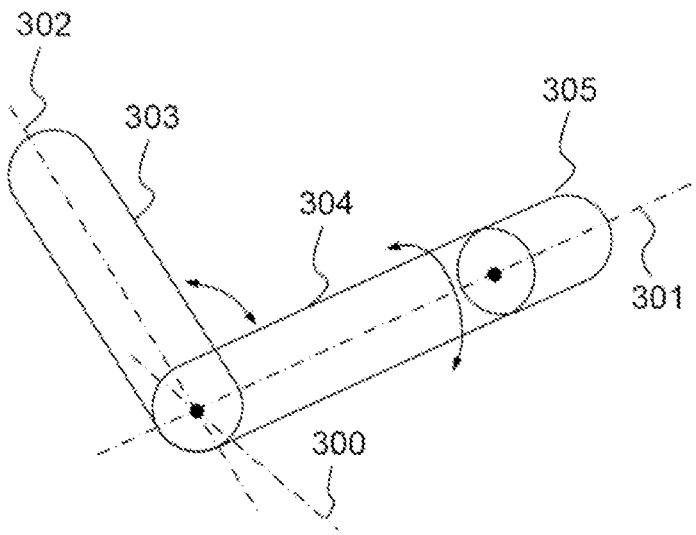
FIG. 3 provides an example of articulation of the elbow and illustrates its influence on the relative movements of the segments that are linked thereto.

FIG. 3 provides an example of articulation of the elbow and its influence on the relative movements of the segments that are linked thereto. The arm 303, the forearm 304 and the hand 305 are represented.

The articulation of the elbow defines the movements of the forearm relative to the arm. This articulation allows two degrees of freedom permitting two concurrent axis rotations corresponding to bending/extension 300 and pronosupination 301 (pronation-supination).

The strains imposed by the articulation of the elbow are:
the prohibition of translation on the three axes;
the prohibition of the third rotation corresponding to the axis of the arm 302;
the stops of the two degrees of freedom corresponding to the minimum and maximum angles allowed.

Figure 4:
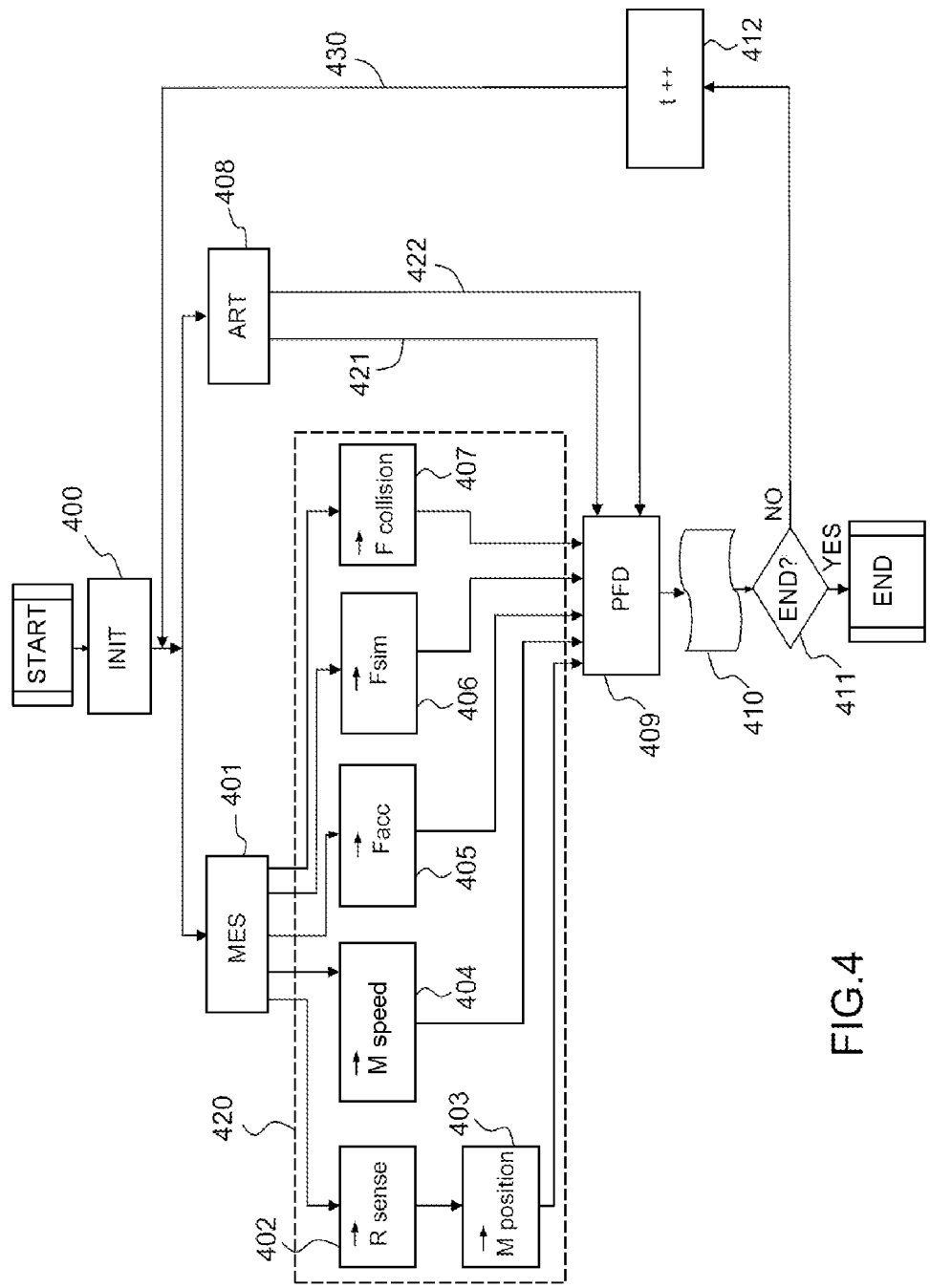
FIG. 4 presents an embodiment of a method for estimating movement of a poly-mass object.

FIG. 4 presents an embodiment of a method for estimating movement of a poly-mass object.

The aim of the method is notably to produce estimations of the kinematic quantities for the segments of the poly-articulated object. These estimations correspond, for the different segments, to the translational position $\vec{p}_{sgmt}$, the rotational position $R_{sgmt}$, the speed of translation $\vec{v}_{sgmt}$ and the speed of rotation $\vec{\omega}_{sgmt}$. These estimations can be produced periodically by using a time step, for example of ten milliseconds.

The method is executed iteratively.

On the first iteration, the initialization step 400 is implemented. For that, default values are used. These default values are obtained for example by asking a player to assume a previously known static pose. His or her translational position relative to the environment is initialized with a chosen value, for example zero.

Then, a step of acquisition of the measurements 401 is executed. These measurements are the result of the operations performed by sensors embedded in the capture modules positioned on the poly-articulated object. In a preferred embodiment, the capture modules comprise two sensors. The first sensor is a gyrometer and the second an accelerometer. In an alternative embodiment, the capture modules comprise a magnetometer as a third sensor.

A step of estimation of the orientation of the capture modules 402 is then applied. For each module, the orientation relative to a reference of the environment is estimated. The result of this step corresponds for example to a rotation matrix $R_{sensor}$.

A rotation matrix R is a matrix of the form:

$$R = \begin{bmatrix} R_{xx} & R_{xy} & R_{xz} \\ R_{yx} & R_{yy} & R_{yz} \\ R_{zx} & R_{zy} & R_{zz} \end{bmatrix} \in \mathbb{R}^{3\times 3}$$

with:

$$R^{-1} = R^T \in \mathbb{R}^{3\times 3}$$

det(R)=1, det(.) representing the determinant.

To write the rotation matrix of a rigid body j relative to another rigid body i serving as reference, the following methodology can be used.

In a first step, a direct orthonormal reference frame $\psi_i$ is chosen as frame of reference, in which the configuration of the rigid body j will be expressed.

In a second step, the direct orthonormal reference frame $\psi_j$ is attached to the rigid body, that is to say that the coordinates of all points of the rigid body expressed in $\psi_j$ are constant in time and are so regardless of the movement of the rigid body j.

In a third step, the matrix R is defined as the matrix of size 3×3 of the coordinates of the three unitary vectors of the axes of the reference frame $\psi_j$ expressed in $\psi_i$. The concatenation is done along the columns.

The estimation of the orientation is produced by using the measurements performed by the sensors of the different capture modules. Thus, the measurement from the accelerometer and the measurement of the rotation speed vector $\vec{\omega}_{sensor}$ of the gyrometer can be used. In addition, a measurement of the initial Earth's magnetic field $\vec{h}_{sensor}$ from a magnetometer can also be used. It should be noted that the estimation of the accelerometer corresponds to the following quantity:

$$R_{sensor}^T(\vec{g} + \vec{a}_{sensor})$$

in which:

$\vec{g}$ represents the gravity;

$\vec{a}_{sensor}$ represents the proper acceleration of the sensor, and therefore of the capture module in which it is embedded.

The estimation of the orientation can be produced by using the technique described in the international patent application publication WO 2010/007160, which is incorporated herein by reference.

A step 403 of determination of a moment $\vec{M}_{position}$ is then applied. For that, a stiffness is used. The moment $\vec{M}_{position}$ is determined from the knowledge of the positioning $R_{sensor}^{sgmt}$ of the sensors on the segments, the orientation of the capture module $R_{sensor}$ estimated in the step 402 and the orientation $R_{sgmt}$ of the segment to which it is attached estimated in the preceding time step. The stiffness is a coefficient used as parameter to convert an orientation deviation into a moment. The deviation is expressed as being the difference between the orientation estimated at the instant t from the measurements acquired and the orientation estimated at the preceding estimation instant.

The stiffness is therefore a parameter and its choice makes it possible to refine the efficiency of estimation of the method. The stiffnesses used can be different from one segment to another.

By way of example, if the stiffness is introduced using a diagonal matrix $K_r$ of size 3×3, the moment $\vec{M}_{position}$ can be determined by using the following expression:

$$\vec{M}_{position} = K_r[\widehat{(R_{sensor}^{sgmt}R_{sgmt} - R_{sensor})} - \widehat{(R_{sensor}^{sgmt}R_{sgmt} - R_{sensor})^T}]$$

in which:

$X^T$ represents the transpose of a matrix X;

$\hat{}$ represents the cap operator such that:

$$\text{for any } v = \begin{bmatrix} v_x \\ v_y \\ v_z \end{bmatrix}, \hat{v} = \begin{bmatrix} 0 & -v_z & v_y \\ v_z & 0 & -v_x \\ -v_y & v_x & 0 \end{bmatrix}$$

A step 404 of determination of a moment $\vec{M}_{speed}$ is then applied and uses a damping. This moment is representative of a speed control on a segment and is generated from the knowledge of the positioning of the capture modules on the segments $R_{sensor}^{sgmt}$, from the speed of rotation of the capture module $\vec{\omega}_{sensor}$ and from the speed of rotation of the segment to which it is attached $\vec{\omega}_{sgmt}$ estimated in the preceding time step, that is to say at the preceding estimation instant.

The damping is a coefficient used as parameter to convert a rotation speed deviation into a moment. The deviation is expressed as the difference between the speed of rotation estimated at the instant t and the speed of rotation estimated at the preceding estimation instant.

The damping is therefore a parameter and its choice makes it possible to refine efficiency of estimation of the method. The dampings used can be different from one segment to another.

By way of example, if $B_r$ is a diagonal matrix of size 3×3 corresponding to damping coefficients, the moment $\vec{M}_{speed}$ can be determined by using the following expression:

$$\vec{M}_{position} = B_r(\vec{\omega}_{sgmt} - R_{sensor}^{sgmt}\vec{\omega}_{sensor})$$

The aim of a step 405 is to determine a force $\vec{F}_{acc}$ representative of an acceleration control. This control corresponds to two phenomena, that is, an action of gravity and a proper acceleration control. The masses m of the segments to which the capture modules are attached are used in order to generate a force $\vec{F}_{acc}$ from the measurement of the accelerometer $R_{sensor}^T(\vec{g} + \vec{a}_{sensor})$ and from the knowledge of the orientation $R_{sensor}$ of the capture module. By way of example, the force $\vec{F}_{acc}$ can be determined for each segment by using the following expression:

$$F_{acc} = mR_{sensor}R_{sensor}^T(\vec{g} + \vec{a}_{sensor})$$

The aim of step 406 is to determine a force $\vec{F}_{sim}$. The masses m of the segments are used in order to generate forces from the position of the segments $\vec{p}_{sgmt}, R_{sgmt}$ estimated in the preceding time step. These forces correspond to the simulation of the weight of the segments not involved in the step 405. It is then possible to determine, for each segment, the force $\vec{F}_{sim}$ simulating the effect of gravity on the segment by using the following expression:

$$\vec{F}_{sim} = m\vec{g}$$

The steps 405, 406 make it possible to realistically simulate the effect of gravity. The masses of the segments are taken into account independently and the gravity is seen as an acceleration.

The aim of step 407 is to determine collision forces $\vec{F}_{collision}$ representative of the stresses that the environment exerts on the poly-articulated object. These forces are determined from contact information obtained from a detection of collision between the geometries of the segments and the geometry of the environment and from the modeling of the friction between the poly-articulated object and the environment. Such contact information corresponds, for example, to the 3D points and the normals for each point of contact. These forces can be computed based on a constraint- or penalty-based method by using the position estimates from the preceding time step. The resolution of the contacts can be produced from a number of different friction modelings and in accordance with the methods conventionally used in the prior art. By way of example, such a method is described in the paper by Trinkle, entitled *Interactive Simulation of Rigid Body Dynamics in Computer Graphics*, State of the Art Reports, 2012.

It appears that a number of techniques 403, 404, 405, 406 for determining stresses 420 can be used. A person skilled in the art can choose at least one of these techniques or a combination of several of these techniques in a particular implementation of the invention. If the steps 405 and 406 are implemented together, one or other of these techniques can be chosen for each segment.

For each articulation, the aim of a step 408 that can be applied in parallel to the stress determination steps 420 previously mentioned is to determine a stress 421 and/or a strain 422 from the link parameters of the physical model and the kinematic quantities of the segments $R_{sgmt}$ and $\omega_{sgmt}$. The link parameters of the physical model are parameters representative of the links implemented by this articulation so as to translate, for example, prohibited rotation axes or stops.

This stress corresponds for example to a set including a force $\vec{F}_{articulation}$ and of a moment $\vec{M}_{articulation}$ for each articulation.

These stresses 421 and/or strains 422 make it possible to ensure that the poly-articulated object is not disarticulated. They can be obtained according to a number of prior art methods such as, for example, the penalties method, the Lagrange multiplying coefficients method, the impulse method or by a reparameterizing of the system, as described in the paper by Trinkle cited previously.

Once the stresses/strains have been determined by the steps 402, 403, 404, 405, 406, 407, 408, the aim of a step 409 is to resolve, under the physical constraints, the equation system of the fundamental principle of dynamics and to do so from the mass and the inertia matrices of the segments. The result of this step corresponds to an estimation 410 of the kinematic quantities $\vec{p}_{sgmt}$, $R_{sgmt}$, $\vec{v}_{sgmt}$ and $\vec{\omega}_{sgmt}$ of each segment.

There is then a check 411 to see if the movement estimation is finished. If it is, the execution is terminated. Otherwise, the time step is incremented 412 and a new iteration 430 is launched.

The method is distinguished from the methods belonging to the prior art notably by the fact that it does not involve a double time integration of the estimates of proper accelerations for each sensor. It is performed globally under physical constraint. Thus, the problem of translational drift is constrained.

The integration and the synthesis of the stresses are performed at the global level by resolving the equation system of the fundamental principle of dynamics under physical constraint. All the constraints are taken into account in a single final step. There is no estimation of intermediate kinematic quantities such as, for example, an estimation of the translational position of the sensors.

Advantageously, the method does not use immobility detection heuristics which makes it possible to set up the method easily. In effect, these heuristics are often difficult to set up because they are dependent on the usage which is made of the movement capture system.

Figure 5:
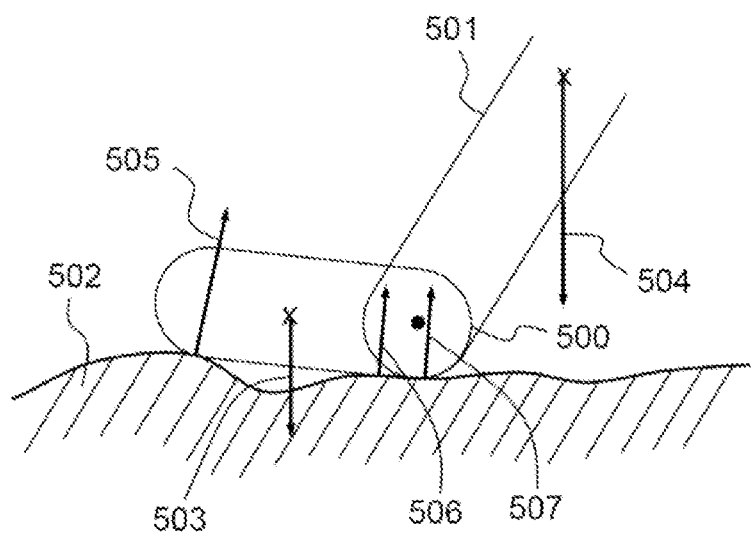
FIG. 5 provides an example of a segment of the physical model in contact with the ground and shows the forces resulting from this contact.

FIG. 5 gives an example of a segment of the physical model in contact with the ground and shows the forces resulting from this contact.

Two segments are represented. The first segment 500 corresponds to a foot and the second segment 501 corresponds to the tibia linked to the foot by an articulation. The segment 500 is in contact with the ground 502. A collision detection phase makes it possible to determine which are the areas of contact of the segment 500 with the ground 502. Then, by taking into account the weight 503, 504 of the segments and the modeling of the friction, collision forces $\vec{F}_{collision}$ 505, 506, 507 can be determined as explained previously.

Figure 6:
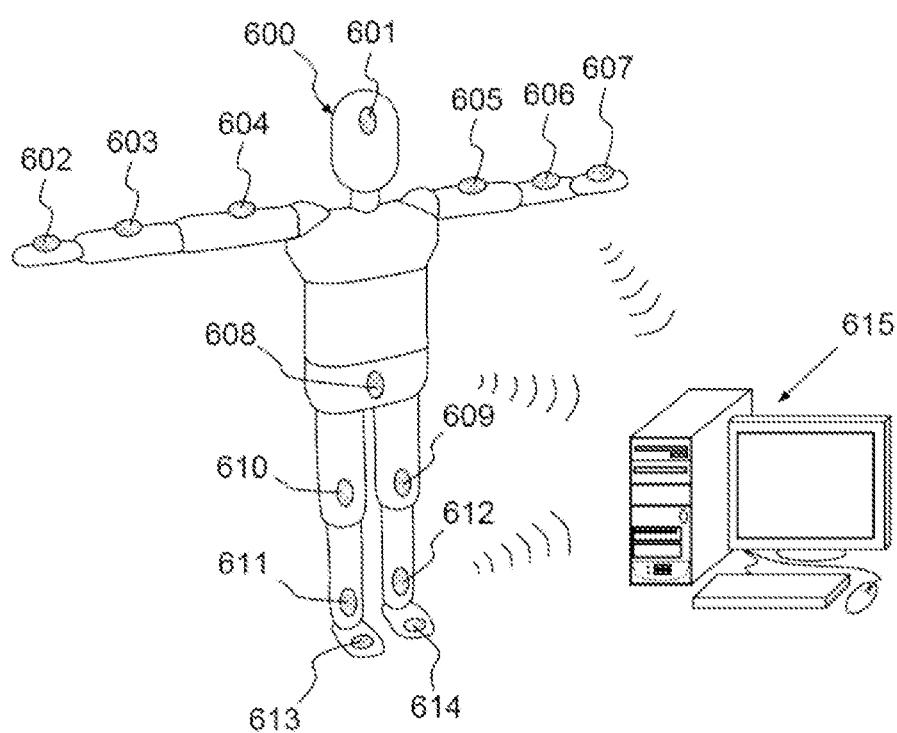
FIG. 6 provides an example of a movement estimation system, in which the movement of an operator is captured so as to animate his or her virtual avatar on a 3D display in real time.

FIG. 6 gives an example of a movement estimation system. In this example, the movement of an operator is captured so as to animate his or her virtual avatar on a 3D display in real time.

Capture modules are used. A capture module has for example three sensors, that is a triaxial accelerometer, a triaxial gyrometer and a triaxial magnetometer. The operator 600 is for example equipped with fourteen capture modules 601, 602, 603, 604, 605, 606, 607, 608, 609, 610, 611, 612, 613, 614 fixed rigidly to his or her body by a suitable clothing combination. The capture modules can be positioned as follows:

one module on each palm 602, 607;
one module on each forearm 603, 606;
one module on each arm 604, 605;
one module on the head 601;
one module on the waist 608;
one module on each thigh 609, 610;
one module on each tibia 611, 612;
one module on each foot 613, 614.

The information from the capture modules is collected by a movement controller, using, for example, a wireless receiver connected by USB to a remote processing unit 615 such as a computer. The processing unit 615 implements the method described previously by using a physical model of the operator.

The aim of the system is for example to animate a virtual human. The physical model includes a plurality of segments linked to one another by articulations. This physical model is for example arranged as follows:

a pelvis serving as reference and being used as root body of the poly-articulated chain. The pelvis has, for example, six degrees of freedom relative to the environment;

a torso of three rigid segments;

collar bones modeled with rigid segments articulated at the sternum;

a neck modeled with a rigid segment;

a head modeled by a segment articulated on the neck;

two feet broken down into two parts, the sole and the heel on one side, the metatarsals and the toes on the other.

The fingers are not modeled, that is to say that they are considered rigidly fixed to the palms. The kinematic modeling comprises, for example, twenty links for a total of forty-five internal degrees of freedom. The articulations are for example limited by articular stops. The geometries of the segments can be chosen as expanded segments, expanded quadrilaterals or complex geometries deriving from computer-assisted design. The inertias can be computed from the geometries of each segment.

The physical model is then positioned in an environment. This environment is for example modeled by an infinite flat floor. The frictions can be modeled by a Coulomb's law with an adhesion coefficient of 0.9.

Advantageously, embodiments of the invention can be applied for very wide-ranging aims and needs such as, for example, movement analysis. In this case, from the knowledge of the movement, specific information is extracted for particular application needs.

Embodiments of the invention can also be used for the complete reconstruction of movement in order for it to be displayed. The movement can then be modified or amplified to obtain desired effects.

Thus, the invention can be used notably in the context of functional re-education, actimetry, sports training, video games, therapeutic diagnostics, therapeutic follow-up, professional training in technical movement, the ergonomics of products, the ergonomics of the workstation, animation, military troop tracking and/or tracking players in emergency services.

What is claimed is:

1. A method for estimating movement of a poly-articulated object comprising a plurality of segments linked by at least one articulation, said method comprising the following steps:

receiving, from a capture module that is fixed relative to a segment, a signal comprising inertial measurements, said capture module comprising an accelerometer and a gyrometer, said inertial measurements being expressed in a measurement reference frame that is fixed relative to said segment;

determining, based on said inertial measurements, at least one stress vector that is external to the poly-articulated object to enable control of a physical model representing the poly-articulated object, wherein the determining the at least one stress vector comprises determination of a moment $\overrightarrow{M_{position}}$ by using a positioning $R_{sensor}^{sgmt}$ of the capture module on the segment, an estimation of an orientation $R_{sensor}$ of the capture module relative to a reference of an environment, and an estimation of an orientation $R_{sgmt}$ of the segment to which the capture module is attached both being estimated in a preceding time step;

determining, based on dynamics modeling using the at least one stress vector, kinematic quantities associated with the segment of the poly-articulated object; and outputting, based on the determined kinematic quantities, an estimated movement of the segment.

2. The method as claimed in claim 1, wherein the steps of the method are applied iteratively with a predefined time step.

3. The method as claimed in claim 1, wherein a step is applied for at least one articulation of the object so as to determine a stress or a strain associated with said articulation from parameters representative of links implemented by the articulation, the stress or the strain being used in the dynamics modeling.

4. The method as claimed in claim 1, wherein measurements of the Earth's magnetic field are acquired from the capture module using a magnetometer.

5. The method as claimed in claim 1, wherein the moment $\overrightarrow{M_{position}}$ is determined by using the following expression:

$$\overrightarrow{M_{position}} = K_r[(R_{sensor}^{sgmt}R_{sgmt} - R_{sensor}) - (R_{sensor}^{sgmt}R_{sgmt} - R_{sensor})^T]^{\hat{}}$$

in which:

$K_r$ is a diagonal matrix of size 3×3 corresponding to stiffness coefficients;

$X^T$ represents a transpose of a matrix X; and $\hat{}$ represents a cap operator such that:

$$\text{for any } v = \begin{bmatrix} v_x \\ v_y \\ v_z \end{bmatrix}, \hat{v} = \begin{bmatrix} 0 & -v_z & v_y \\ v_z & 0 & -v_x \\ -v_y & v_x & 0 \end{bmatrix}.$$

6. The method as claimed in claim 1, in which a step of determination of a moment $\overrightarrow{M_{speed}}$ representative of a speed control on the segment is performed after receiving the signal, said moment being determined from a positioning $R_{sensor}^{sgmt}$ of the capture module on the segment, from a speed of rotation of the capture module $\omega_{sensor}$ and from a speed of rotation of the segment to which the capture module is attached $\omega_{sgmt}$ estimated in the preceding time step.

7. The method as claimed in claim 6, wherein the moment $\overrightarrow{M_{speed}}$ is determined by using the following expression:

$$\overrightarrow{M_{position}} = B_r(\overrightarrow{\omega_{sgmt}} - R_{sensor}^{sgmt}\overrightarrow{\omega_{sensor}})$$

in which:

$B_r$ is a diagonal matrix of size 3×3 corresponding to damping coefficients.

8. The method as claimed in claim 1, further comprising a step that determines a force $\overrightarrow{F_{acc}}$ representative of an acceleration control including gravity on the segment by using a mass m of the segment to which the capture module is attached, measurements produced by the accelerometer, and an estimation of an orientation $R_{sensor}$ of said module.

9. The method as claimed in claim 8, wherein the force $\overrightarrow{F_{acc}}$ is determined for the segment by using the following expression:

$$\overrightarrow{F_{acc}} = mR_{sensor}R_{sensor}^T(\overrightarrow{g} + \overrightarrow{a_{sensor}})$$

in which:

$\overrightarrow{g}$ represents the gravity vector; and $\overrightarrow{a_{sensor}}$ represents a proper acceleration of the capture module.

10. The method as claimed in claim 1, further comprising a step that determines a force $\vec{F}_{sum}$ simulating an effect of gravity on the segment by using a mass m of the segment and a position of the segment $\vec{p}_{sgmt}$, $R_{sgmt}$ estimated in a preceding time step.

11. The method as claimed in claim 1, further comprising determining collision forces $\vec{F}_{collision}$, said forces being determined from contact information obtained from a detection of collision between a geometry of the segment and a geometry of an environment and from modeling friction between the poly-articulated object and the environment.

12. A system for estimating movement of a poly-articulated object—comprising a plurality of segments linked by at least one articulation, the system comprising:
   at least one capture module positioned on at least one segment of the poly-articulated object, said module being fixed relative to the segment and comprising at least one accelerometer and one gyrometer;
   a receiver configured to receive inertial measurements from the at least one capture module, said inertial measurements being expressed in a measurement reference frame that is fixed relative to said segment;
   a processing unit configured to determine, based on said inertial measurements, at least one stress vector that is external to the poly-articulated object to enable control of a physical model representing the poly-articulated object, wherein the determining the at least one stress vector comprises determination of a moment $\vec{M}_{position}$ by using a positioning $R_{sensor}{}^{sgmt}$ of the capture module on the segment, an estimation of an orientation $R_{sensor}$ of the capture module relative to a reference of an environment, and an estimation of an orientation $R_{sgmt}$ of the segment to which the capture module is attached both being estimated in a preceding time step, and to determine, based on dynamics modeling using the at least one stress vector, kinematic quantities associated with the segment of the poly-articulated object; and
   the processing unit further configured to output, based on the determined kinematic quantities, an estimated movement of the segment.

13. A non-transitory computer-readable media storing computer-readable instructions that when executed by a processor of a computer, cause the computer to perform operations comprising:
   receiving, from a capture module that is fixed relative to a segment, a signal comprising inertial measurements, said capture module comprising an accelerometer and a gyrometer, said inertial measurements being expressed in a measurement reference frame that is fixed relative to said segment;
   determining, based on said inertial measurements, at least one stress vector that is external to a poly-articulated object to enable control of a physical model representing the poly-articulated object, wherein the determining the at least one stress vector comprises determination of a moment $\vec{M}_{position}$ by using a positioning $R_{sensor}{}^{sgmt}$ of the capture module on the segment, an estimation of an orientation $R_{sensor}$ of the capture module relative to a reference of an environment, and an estimation of an orientation $R_{sgmt}$ of the segment to which the capture module is attached both being estimated in a preceding time step;
   determining, based on dynamics modeling using the at least one stress vector, kinematic quantities associated with the segment of the poly-articulated object; and
   outputting, based on the determined kinematic quantities, an estimated movement of the segment.

14. A method for estimating movement of a poly-articulated object comprising a plurality of segments linked by at least one articulation, said method comprising the following steps:
   receiving, from a capture module that is fixed relative to a segment, a signal comprising inertial measurements, said capture module comprising an accelerometer and a gyrometer, said inertial measurements being expressed in a measurement reference frame that is fixed relative to said segment;
   determining, based on said inertial measurements, at least one stress vector that is external to the poly-articulated object to enable control of a physical model representing the poly-articulated object, wherein the determining the at least one stress vector comprises determination, after receiving the signal, of a moment $\vec{M}_{speed}$ representative of a speed control on the segment, said moment being determined from a positioning $R_{sensor}{}^{sgmt}$ of the capture module on the segment, from a speed of rotation of the capture module $\omega_{sensor}$, and from a speed of rotation of the segment to which the capture module is attached $\omega_{sgmt}$ estimated in a preceding time step;
   determining, based on dynamics modeling using the at least one stress vector, kinematic quantities associated with the segment of the poly-articulated object; and
   outputting, based on the determined kinematic quantities, an estimated movement of the segment.

15. The method of claim 14, wherein the moment $\vec{M}_{speed}$ is determined by using the following expression:

$$\vec{M_{position}} = B_r(\vec{\omega_{sgmt}} - R_{sensor}{}^{sgmt}\vec{\omega_{sensor}})$$

in which:
$B_r$ is a diagonal matrix of size 3×3 corresponding to damping coefficients.

16. A method for estimating movement of a poly-articulated object comprising a plurality of segments linked by at least one articulation, said method comprising the following steps:
   receiving, from a capture module that is fixed relative to a segment, a signal comprising inertial measurements, said capture module comprising an accelerometer and a gyrometer, said inertial measurements being expressed in a measurement reference frame that is fixed relative to said segment;
   determining, based on said inertial measurements, at least one stress vector that is external to the poly-articulated object to enable control of a physical model representing the poly-articulated object, wherein the determining the at least one stress vector comprises determining a force $\vec{F}_{acc}$ representative of an acceleration control including gravity on the segment by using a mass m of the segment to which the capture module is attached, measurements produced by the accelerometer, and an estimation of an orientation $R_{sensor}$ of said module;
   determining, based on dynamics modeling using the at least one stress vector, kinematic quantities associated with the segment of the poly-articulated object; and outputting, based on the determined kinematic quantities, an estimated movement of the segment.

17. The method as claimed in claim 16, wherein the force $\vec{F}_{acc}$ is determined for the segment by using the following expression:

$$\vec{F}_{acc} = mR_{sensor}R_{sensor}^T(\vec{g} + \vec{a}_{sensor})$$

in which:

$\vec{g}$ represents the gravity vector; and $\vec{a}_{sensor}$ represents a proper acceleration of the capture module.

18. A method for estimating movement of a poly-articulated object comprising a plurality of segments linked by at least one articulation, said method comprising the following steps:
receiving, from a capture module that is fixed relative to a segment, a signal comprising inertial measurements, said capture module comprising an accelerometer and a gyrometer, said inertial measurements being expressed in a measurement reference frame that is fixed relative to said segment;
determining, based on said inertial measurements, at least one stress vector that is external to the poly-articulated object to enable control of a physical model representing the poly-articulated object, wherein the determining the at least one stress vector comprises determining a force $\vec{F}_{sun}$ simulating an effect of gravity on the segment by using a mass m of the segment and a position of the segment $\vec{p}_{sgmt}$, $R_{sgmt}$ estimated in a preceding time step;
determining, based on dynamics modeling using the at least one stress vector, kinematic quantities associated with the segment of the poly-articulated object; and
outputting, based on the determined kinematic quantities, an estimated movement of the segment.

19. A method for estimating movement of a poly-articulated object comprising a plurality of segments linked by at least one articulation, said method comprising the following steps:
receiving, from a capture module that is fixed relative to a segment, a signal comprising inertial measurements, said capture module comprising an accelerometer and a gyrometer, said inertial measurements being expressed in a measurement reference frame that is fixed relative to said segment;
determining, based on said inertial measurements, at least one stress vector that is external to the poly-articulated object to enable control of a physical model representing the poly-articulated object, wherein the determining the at least one stress vector comprises determining collision forces $\overline{F_{collision}}$, said forces being determined from contact information obtained from a detection of a collision between a geometry of the segment and a geometry of an environment and from modeling friction between the poly-articulated object and the environment;
determining, based on dynamics modeling using the at least one stress vector, kinematic quantities associated with the segment of the poly-articulated object; and
outputting, based on the determined kinematic quantities, an estimated movement of the segment.

* * * * *